US012754339B2

(12) United States Patent
Cook et al.

(10) Patent No.: US 12,754,339 B2
(45) Date of Patent: Oct. 6, 2026

(54) SEAL POCKET DETECTION ASSEMBLY

(71) Applicant: FMC Technologies, Inc., Houston, TX (US)

(72) Inventors: James Cook, Houston, TX (US); Chad Vrla, Houston, TX (US); Rajeev Pillai, Houston, TX (US); Pablito Derayunan, Odessa, TX (US); Thiago Machado, Houston, TX (US); Corey Massey, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 18/987,721

(22) Filed: Dec. 19, 2024

(65) Prior Publication Data

US 2025/0116792 A1 Apr. 10, 2025

Related U.S. Application Data

(63) Continuation of application No. 18/320,954, filed on May 19, 2023, now Pat. No. 12,210,131.

(51) Int. Cl.
*G01V 3/10* (2006.01)
*E21B 33/03* (2006.01)

(52) U.S. Cl.
CPC ................ *G01V 3/10* (2013.01); *E21B 33/03* (2013.01)

(58) Field of Classification Search
CPC ................................. G01V 3/10; E21B 33/03
USPC ........................................................ 166/66
See application file for complete search history.

(56) References Cited

U.S. PATENT DOCUMENTS

| | | | | |
|---|---|---|---|---|
| 5,323,856 | A * | 6/1994 | Davis | E21B 47/092 175/45 |
| 10,480,310 | B2 * | 11/2019 | Donderici | E21B 47/092 |
| 2014/0327443 | A1 * | 11/2014 | Liu | G01V 3/081 324/326 |
| 2019/0271419 | A1 * | 9/2019 | Anton | F16L 19/05 |

* cited by examiner

*Primary Examiner* — Tara Schimpf
*Assistant Examiner* — Patrick F Lambe
(74) *Attorney, Agent, or Firm* — Erise IP, P.A.

(57) ABSTRACT

Systems, methods, and at least one seal pocket detection assembly configured to be placed within a pressure cavity of a well tubing system. The seal pocket detection assembly includes a selectively removable insert body supporting one or more seals and one or more coils that produce an electromagnetic field extending into the bore of tubing sections of the well tubing system. The seal pocket detection assembly is configured to detect a ferrous object passing through the bore.

20 Claims, 8 Drawing Sheets

SEAL POCKET DETECTION ASSEMBLY

CROSS-REFERENCE TO RELATED APPLICATIONS

This patent application is a continuation application claiming priority benefit, with regard to all common subject matter, of U.S. patent application Ser. No. 18/320,954, filed on May 19, 2023, and entitled "SEAL POCKET DETECTION ASSEMBLY". The above-referenced patent is hereby incorporated by reference in its entirety into the present application.

BACKGROUND

1. Field

Embodiments of the invention relate to well tree tubing systems. More specifically, embodiments of the invention relate to a seal pocket detection assembly for a well tree tubing system.

2. Related Art

Well tree operations such as hydraulic fracturing operations utilize wellhead and sub-surface tubing systems including sub-surface tubing sections that extend underground, for example to reach a gas rich underground formation. A variety of different tools and objects may be lowered through the bore of the tubing sections to carry out and facilitate said operations. For example, a perforating gun may be placed into the well tree and lowered down through sections of the tubing bore to produce perforations in the tubing casing that penetrate the surrounding underground formation. Accordingly, one or more detection means may be used to locate objects passing through the well tree and tubing bore. However, current means for identifying objects within the well tree and bore lack high sensitivity detection capabilities. As an example, detection means exist that include permanently disposed magnets placed outside of the pressure cavity of the tubing sections. Therefore, the sensitivity of the detection becomes limited because the magnets are placed outside of the pressure cavity and further away from the tubing bore. Further, the magnets are permanently disposed at sections of the tubing such that they cannot be removed for replacement or repair.

Additionally, a plurality of pumps, valves, and other mechanical components may be disposed within the well tree, for example, to control pressure and flow within the well system. As such, actuation of said mechanical components is potentially dangerous while a tool, wireline, or other object is currently disposed in the well tree. Accordingly, detection of said objects within the well tree may be used to prevent potential damage associated with actuating mechanical components of the well tree.

SUMMARY

Embodiments of the invention solve the above-mentioned problems by providing at least one seal pocket detection assembly configured to be placed within a pressure cavity of a well tree tubing system. The seal pocket assembly includes a selectively removable insert body supporting one or more seals and one or more coils that produce an electromagnetic field extending into the bore of tubing sections of the well tree tubing system capable of detecting a ferrous object passing through the bore.

In some aspects, the techniques described herein relate to a seal pocket detection assembly disposed at a joint of one or more well tree tubing sections, the seal pocket detection assembly including: a removable insert body; one or more seals disposed at an inner surface of the removable insert body, the one or more seals providing a pressure seal to the joint; and a coil assembly disposed at least partially within the pressure seal of the joint, the coil assembly including: a coil assembly housing disposed at an outer surface of the removable insert body; and at least one coil disposed around a bore of the one or more well tree tubing sections in a cavity of the coil assembly housing, wherein the at least one coil produces an electromagnetic field within the bore, wherein the coil assembly detects a ferrous object disposed within the bore of the one or more well tree tubing sections based on a change to the electromagnetic field associated with the ferrous object passing through the electromagnetic field.

In some aspects, the techniques described herein relate to a seal pocket detection assembly, wherein the coil assembly further includes: a coil assembly cover disposed over the outer surface of the removable insert body.

In some aspects, the techniques described herein relate to a seal pocket detection assembly, wherein the coil assembly further includes: a primary coil disposed in a first cavity of the coil assembly housing; and a secondary coil disposed in a second cavity of the coil assembly housing.

In some aspects, the techniques described herein relate to a seal pocket detection assembly, wherein the coil assembly housing includes a plastic enclosure defining the first cavity and the second cavity.

In some aspects, the techniques described herein relate to a seal pocket detection assembly, wherein the ferrous object detected by the coil assembly includes a perforating gun.

In some aspects, the techniques described herein relate to a seal pocket detection assembly, further including: a spacer that contains a pressure within the joint of the one or more well tree tubing sections, the spacer including a non-ferrous material such that the spacer does not interfere with the electromagnetic field.

In some aspects, the techniques described herein relate to a seal pocket detection assembly, wherein the ferrous object is attached to a non-ferrous component for detection of the non-ferrous component.

In some aspects, the techniques described herein relate to a seal pocket detection system disposed at a joint of one or more well tree tubing sections, the seal pocket detection system including: an upper seal pocket detection assembly including: an upper removable insert body disposed at an upper portion of the joint; an upper coil assembly including: an upper coil assembly housing disposed at an outer surface of the upper removable insert body; a primary upper coil disposed around a bore of the one or more well tree tubing sections in a first cavity of the upper coil assembly housing; and a secondary upper coil disposed around the bore of the one or more well tree tubing sections in a second cavity of the upper coil assembly housing; and a lower seal pocket detection assembly including: a lower removable insert body disposed at a lower portion of the joint; a lower coil assembly including: a lower coil assembly housing disposed at an outer surface of the lower removable insert body; a primary lower coil disposed around the bore of the one or more well tree tubing sections in a first cavity of the lower coil assembly housing; and a secondary lower coil disposed around the bore of the one or more well tree tubing sections in a second cavity of the lower coil assembly housing; one or more seals disposed at an inner surface of the upper removable insert body and the lower removable insert body, the one or more seals providing a pressure seal to the joint; and wherein the upper coil assembly and the lower coil assembly detect at least one ferrous object disposed within the bore of the one or more well tree tubing sections.

In some aspects, the techniques described herein relate to a seal pocket detection system, wherein the upper seal pocket detection assembly has a higher electromagnetic detection sensitivity than the lower seal pocket detection assembly.

In some aspects, the techniques described herein relate to a seal pocket detection system, wherein the upper coil assembly and the lower coil assembly are disposed in a series along the bore of the one or more well tree tubing sections to thereby monitor a direction of the at least one ferrous object.

In some aspects, the techniques described herein relate to a seal pocket detection system, wherein the upper seal pocket detection assembly is configured to operate actively by applying electrical power to the primary upper coil and measuring an electromagnetic field using the secondary upper coil.

In some aspects, the techniques described herein relate to a seal pocket detection system, wherein the upper seal pocket detection assembly is configured to operate passively to detect a magnetic field associated with the at least one ferrous object.

In some aspects, the techniques described herein relate to a seal pocket detection system, wherein the upper seal pocket detection assembly and the lower seal pocket detection assembly are disposed within a single pressure containing body of the joint.

In some aspects, the techniques described herein relate to a seal pocket detection system, wherein the joint includes a cross-flow connection of the one or more well tree tubing sections and the upper removable insert body and the lower removable insert body are disposed adjacent to the cross-flow connection.

In some aspects, the techniques described herein relate to a well tubing system including: a plurality of tubing sections; a plurality of joints, each joint of the plurality of joints connecting a respective pair of tubing sections of the plurality of tubing sections; and a plurality of seal pocket detection assemblies, each seal pocket detection assembly of the plurality of seal pocket detection assemblies disposed at a respective joint of the plurality of joints and including: a removable insert body; one or more seals disposed at an inner surface of the removable insert body, the one or more seals providing a pressure seal to the respective joint; and a coil assembly including: a coil assembly housing disposed at an outer surface of the removable insert body; and at least one coil disposed around a bore of the respective pair of tubing sections in a cavity of the coil assembly housing, wherein the at least one coil produces an electromagnetic field within the bore of the respective pair of tubing sections, wherein the coil assembly detects a ferrous object disposed within the bore of the respective pair of tubing sections based on a change to the electromagnetic field associated with the ferrous object passing through the electromagnetic field.

In some aspects, the techniques described herein relate to a well tubing system, further including: a plurality of clamps, each clamp of the plurality of clamps disposed around a respective joint to secure the respective pair of tubing sections together.

In some aspects, the techniques described herein relate to a well tubing system, wherein the well tubing system is a hydraulic fracturing system.

In some aspects, the techniques described herein relate to a well tubing system, further including: one or more valves associated with the plurality of tubing sections, wherein the one or more valves are adjusted in response to the coil assembly detecting the ferrous object.

In some aspects, the techniques described herein relate to a well tubing system, further including: a cable routing port including a cable routing opening for receiving one or more cables within a hub of at least one of the plurality of tubing sections.

In some aspects, the techniques described herein relate to a well tubing system, further including: a test port including a test opening within the hub of at least one of the plurality of tubing sections.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
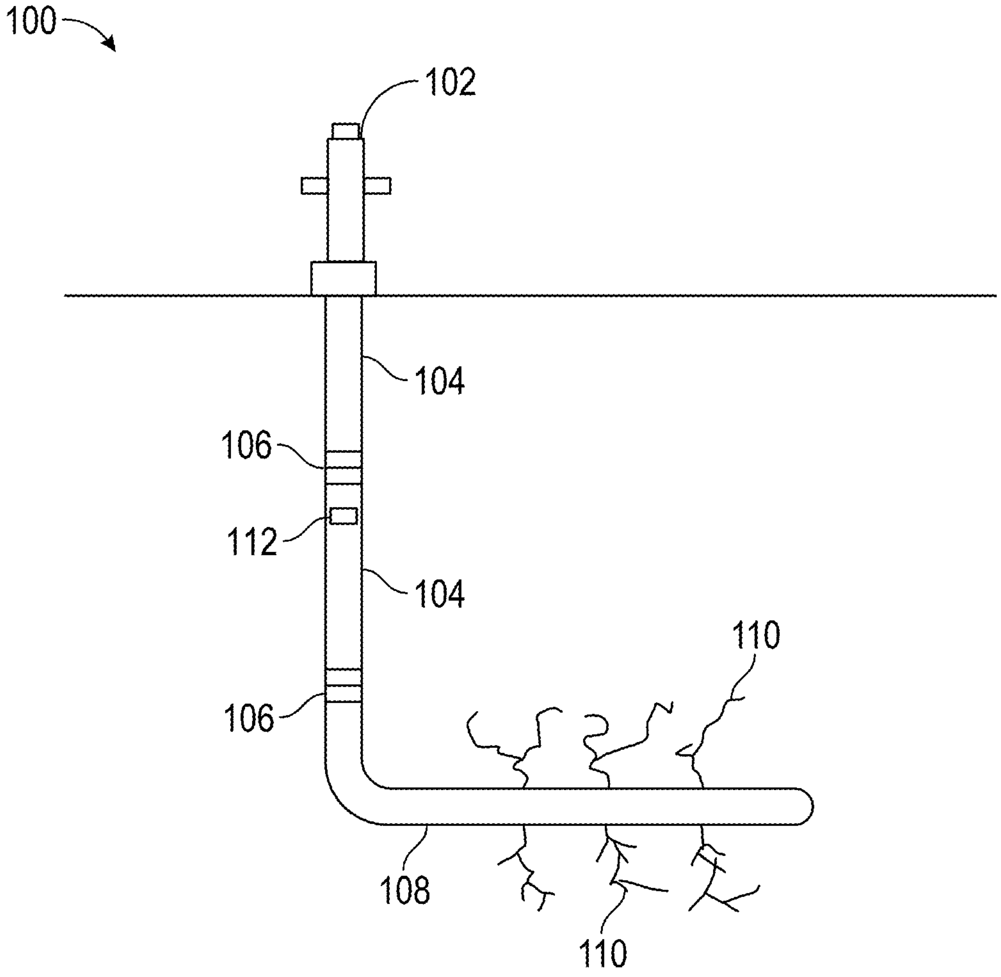
FIG. 1 illustrates an exemplary hydraulic fracturing system relating to some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Aspects of the present disclosure provide a seal pocket detection assembly for removable installation within a well tubing system, for example, at a joint between two or more tubing sections. The seal pocket assembly includes one or more coils disposed within a pressure cavity of the well tubing system and concentrically around a bore of the tubing sections. The one or more coils produce an electromagnetic field that extends into the bore to thereby detect ferrous objects within the bore, such as, tools, debris, or other objects passing through the bore. Wrapping the coils around a diameter of the tubing bore provides a substantially increased detection sensitivity over prior art sensing techniques that place a magnet or other sensor outside of the pressure cavity and at one end of the tubing. It should be understood that the tubing as referred to herein may comprise any of vertically oriented or horizontally oriented portions of tubing, as well as other orientations not explicitly described herein. Further, the tubing sections may be disposed above ground near a well head or below ground at a sub-surface portion of a well.

FIG. 1 illustrates an exemplary hydraulic fracturing system 100 relating to some embodiments. The hydraulic fracturing system 100 comprises a well accessible at a wellhead via a surface well tree 102 disposed above ground and a plurality of well tubing sections 104. In some embodiments, the plurality of well tubing sections 104 is provided in the surface well tree 102, which is disposed at surface level (further discussed below with respect to FIG. 5). In such an embodiment where the plurality of tubing sections 104 is disposed in the well tree 102, the plurality of tubing sections is well tree tubing sections. In other embodiments, the plurality of tubing sections 104 is provided sub-surface, and in such an embodiment are sub-surface tubing sections. Each tubing section of the plurality of tubing sections 104 comprises one or more pressure containment structures defining an internal bore of the respective tubing section and maintaining an internal pressure of the tubing section. In some embodiments, the plurality of tubing sections 104 is connected at a respective plurality of joints 106. As should be appreciated, the surface well tree 102 may include the plurality of joints 106 connecting the plurality of tubing sections 104.

In some embodiments, the plurality of tubing sections 104 may comprise a first portion of vertically oriented tubing sections and a second portion of horizontally oriented tubing sections, such as the horizontal tubing section 108, as shown. In some embodiments, the horizontal sub-surface tubing section 108 may comprise a plurality of openings for generating fractures 110 at a gas rich underground layer.

The hydraulic fracturing system 100 may be employed to carry out a hydraulic fracturing operation by pumping fluid from the surface well tree 102 down the tubing sections 104. In some embodiments, an object 112 including any of one or more tools or other objects may be lowered into the well through the tubing sections 104. In some embodiments, the object 112 comprises any of a perforating gun, an isolation ball, or a wire. For example, a fracturing tool comprising a perforating gun configured to blow holes in the tubing sections may be lowered into the well to generate openings in the tubing sections, such as in the horizontal tubing section 108, and perforate through the tubing casing into the surrounding underground formation. Similarly, an isolation ball may be lowered through the boring to selectively isolate a portion of the tubing system by sealing off a set plug associated with a particular section of the bore.

During the process of lowering the object 112, including guiding the object 112 through the surface well tree 102, a detection portion of the hydraulic fracturing system 100 may be used to identify and determine whether the tool or other object is currently traversing the tubing sections 104, such as tubing sections 104 within the well tree. Further, embodiments are contemplated in which a particular type of object (or absence thereof) is identified within the bore of the tubing sections 104 and/or where the object is located within the tubing sections 104. Accordingly, operations of the hydraulic fracturing system 100 may be informed by the detection of an object detected in the bore of the tubing sections 104. For example, one or more valves may be prevented from closing to prevent interfering with a wire that is attached to the object. Accordingly, the wire will not be cut by closing the valves while the wire is currently inside of the bore.

In some embodiments, a control system may be included. For example, the control system may be disposed on the surface at or proximate the well tree 102 for controlling operations of the hydraulic fracturing system 100. The control system may include at least one processor for processing, receiving, transmitting, and/or storing information and for executing computer-readable media. However, it should be understood that a variety of other functions and different locations of the at least one processor are also contemplated.

Figure 2A:
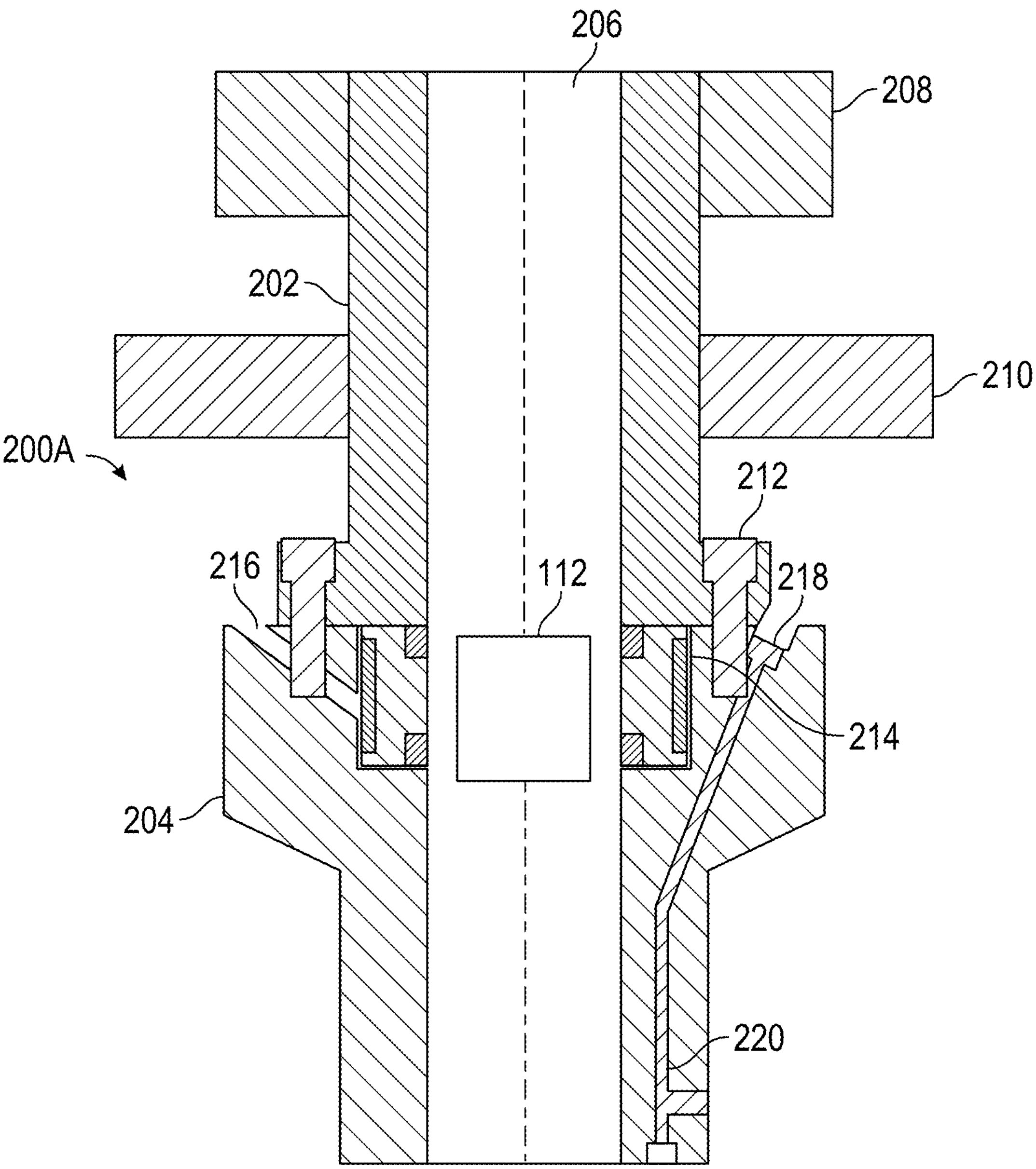
FIG. 2A illustrates a cross-sectional view of an exemplary tubing section joint relating to some embodiments.

FIG. 2A illustrates a cross-sectional view of an exemplary tubing section joint 200A relating to some embodiments. The tubing section joint 200A comprises an upper tubing section 202 and a lower tubing section 204. The upper tubing section 202 and the lower tubing section 204 share an internal bore 206. In some embodiments, the internal bore 206 comprises a pressurized internal opening within the tubing sections operable to pump fluids or receive solid objects for traversal through the respective tubing sections.

In some embodiments, one or more flanges 208 are connected to tubing sections. For example, a horizontally oriented flange 208 with a diameter of about five and one eighth inches may be included secured to the upper tubing section 202. However, it should be understood that flanges with different diameters and structural orientations are also contemplated, for example, to provide a tree of tubing connections and structures. Similarly, one or more plates 210 may be included, such as an upper plate 210 disposed around a respective tubing section.

In some embodiments, the upper tubing section 202 and the lower tubing section 204 of the exemplary tubing section joint 200A are structurally secured using one or more bolts 212. In some embodiments, the bolts 212 may be disposed circumferentially around the exterior of the respective tubing sections. For example, each of the upper tubing section 202 and the lower tubing section 204 may comprise a plurality of threaded holes for receiving the bolts 212 that secure the upper tubing section 202 and the lower tubing section 204 at the exemplary tubing section joint 200A.

In some embodiments, a seal pocket detection assembly 214 (also referred to herein as a "seal pocket assembly" in short) is included, disposed at the exemplary tubing section joint 200A. The seal pocket assembly 214 comprises a sealing portion operable to provide a pressure seal to the joint 200A and a detection portion operable to detect one or more objects within the bore 206, such as the object 112. In some embodiments, the object 112 comprises a ferrous object that is detectable by the seal pocket assembly 214. For example, embodiments are contemplated in which a sensing portion of the seal pocket assembly 214 generates an electromagnetic field within the bore 206. Accordingly, the ferrous object may interfere with the electromagnetic field as the object 112 passes through the bore 206 in the vicinity of the seal pocket assembly 214. Similarly, the seal pocket assembly 214 may detect the object 112 within the bore 206 even if the object 112 is stationary within the bore 206.

Embodiments are contemplated in which the object 112 includes a non-ferrous object with a ferrous object attached to the non-ferrous object such that the object 112 is detectable. For example, a perforating gun may be composed of a non-ferrous material, but a ferrous object such as a magnet or metal material is attached to the perforating gun such that the perforating gun can be detected by the seal pocket assembly 214. Alternatively, or additionally, in some embodiments, the object 112 may be ferrous itself or may be coated with a ferrous covering to increase detectability.

Additionally, or alternatively, embodiments are contemplated in which other forms of detection are used. For example, a capacitance detection technique may be used employing one or more capacitance sensors configured to detect a capacitance associated with a presence of the object 112 disposed in the bore 206. Accordingly, non-ferrous materials may be detected based on capacitance. As such, objects or fluids that are non-ferrous may be detected within the bore such as, water and components composed of non-metal material.

In some embodiments, a cable routing port 216 may be included comprising an opening through one or more of the tubing sections, such as a diagonally oriented hole through a portion of the lower tubing section 204, as shown. The cable routing port 216 may be used, for example, to route one or more cables that provide a communication connection with the seal pocket assembly 214. For example, a signal including information indicative of the detected object 112 may be transmitted through a cable disposed in the cable routing port 216. Similarly, in some embodiments, a testing port 218 is included that comprises an opening through one or more of the tubing sections, such as a diagonally oriented hole through another portion of the lower tubing section 204, as shown. The testing port 218 receives a testing cable 220 for measuring one or more internal parameters associated with the tubing sections.

Additionally, embodiments are contemplated in which wireless communication may be used. For example, in some embodiments, the cable routing port 216 is not included and a wireless communication connection is used to transmit signals from the seal pocket assembly 214. The wireless communication connection may utilize any of a network connection, a Bluetooth connection, or any other form of wireless communication technique. In some such embodiments, one or more batteries or other form of remote power source may be included for providing electrical power to the seal pocket assembly 214. Accordingly, the removability of the seal pocket assembly 214 becomes advantageous for replacing the batteries within the seal pocket assembly 214.

In some embodiments, the seal pocket assembly 214 comprises a linear variable differential transformer (LVDT) configured to measure displacement of one or more ferrous objects disposed within a bore of the tubing sections. In some such embodiments, the LVDT may include one or more electrical coils that generate at least one electromagnetic field within the tubing section bore. Accordingly, the LVDT may be used to detect the ferrous object based on a change to the electromagnetic field attributed to the ferrous object moving through the electromagnetic field. The LVDT may be integrated directly into the seal pocket assembly 214 such that the seal pocket assembly 214 provides both sealing and detection functionality.

Figure 2B:
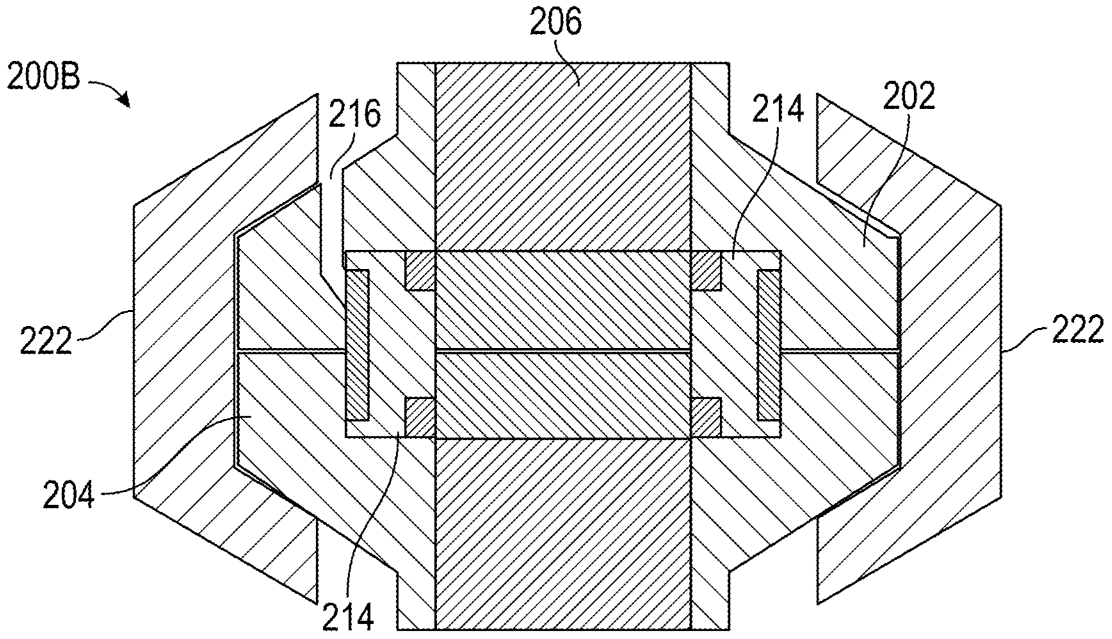
FIG. 2B illustrates a cross-sectional view of an exemplary tubing section joint relating to some embodiments.

FIG. 2B illustrates a cross-sectional view of an exemplary tubing section joint 200B relating to some embodiments. Similar to the exemplary tubing section joint 200A described above, the exemplary tubing section joint 200B joins the upper tubing section 202 and the lower tubing section 204. The exemplary tubing section joint 200B comprises the seal pocket assembly 214 disposed at an internal portion of the joint 200B between the upper tubing section 202 and the lower tubing section 204. In some embodiments, the exemplary tubing section joint 200B also comprises the cable routing port 216, as shown.

In some embodiments, the upper tubing section 202 and the lower tubing section 204 of the joint 200B are secured together using one or more clamps 222 disposed around an external surface of the respective tubing sections. In some such embodiments, the clamp 222 provides a clamping force pushing inwards into the joint 200B suitable to maintain the connection of the upper tubing section 202 and the lower tubing section 204. In some cases, the clamping force of the clamp 222 also maintains pressure within the joint 200B. Accordingly, embodiments are contemplated in which the seal pocket assembly 214 is disposed concentrically within the clamp 222 at the joint 106 of the upper tubing section 202 and lower tubing section 204.

Figure 3A:
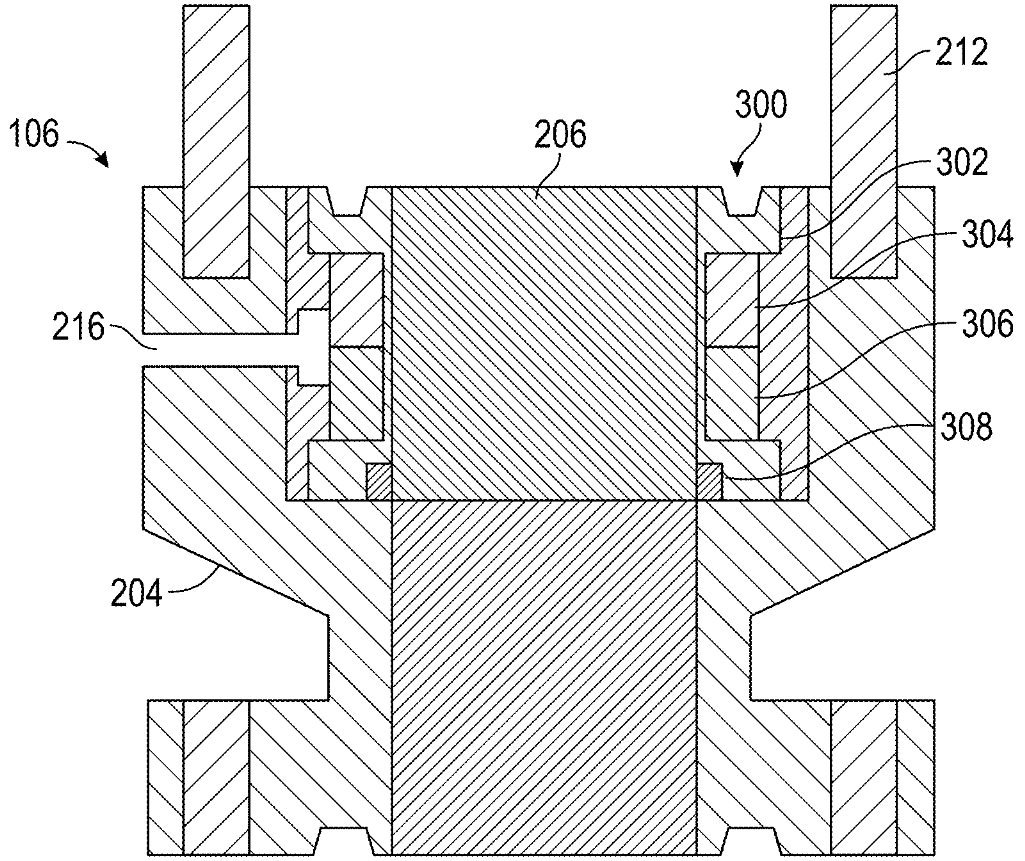
FIG. 3A illustrates a cross-sectional view of an exemplary tubing section joint with a dual coil seal pocket assembly relating to some embodiments.

FIG. 3A illustrates a cross-sectional view of an exemplary tubing section joint 106 with a dual coil seal pocket assembly relating to some embodiments. The exemplary tubing section joint 106 comprises a dual coil seal pocket assembly 300 including an insert body 302, a primary coil 304, a secondary coil 306, and a seal ring 308. The components of the dual coil seal pocket assembly 300 may be arranged as described below. However, it should be understood that a variety of alternative and modified arrangements are also contemplated.

In such embodiments, the insert body 302 is disposed at an internal portion of the joint 106 in a pressurized cavity of the bore 206. The primary coil 304 and the secondary coil 306 are disposed around an external surface of the insert body 302 such that each of the primary coil 304 and the secondary coil 306 is wrapped around the outside of the internal bore 206 of the tubing sections. The seal ring 308 is disposed at an inner surface of the insert body 302. For example, the seal ring 308 may be disposed at a bottom end of the insert body 302 within an internal circumference of the insert body 302, as shown, to maintain a pressure inside the joint 106. However, it should be understood that embodiments are contemplated in which the seal ring 308 may be disposed at a top end of the insert body 302, not shown. Additionally, or alternatively, embodiments are contemplated in which a first seal ring is disposed at a top end of the insert body 302, while a second seal ring is disposed at a bottom end of the insert body 302.

The seal pocket assembly 300 is configured to provide an electromagnetic field within the bore 206 of the tubing sections. In such embodiments, the electromagnetic field may be generated by one of or both of the primary coil 304 and the secondary coil 306. Alternatively, or additionally, in some embodiments, separate electromagnetic fields may be generated by each coil or the electromagnetic field may be generated by a single coil. The primary coil 304 and the secondary coil 306 are concentrically wrapped around the diameter of the bore 206 to provide an increased detection sensitivity. Accordingly, the electromagnetic field is at least partially generated within the bore 206 and, in some cases, a central portion of the electromagnetic field coincides with a center of the bore 206. As such, the detection sensitivity is increased, for example, relative to detection systems that place coils, sensors, or magnets outside of the tubing sections or at one side of the bore.

Any of active energized coils, passive non-energized coils, or combinations thereof are contemplated. For example, in some embodiments, an active first coil is included that is energized by applying electrical power using a power source of the well tubing system along with a passive second coil that is not actively energized. Accordingly, in some such embodiments, the electromagnetic field is generated by the first coil and detected passively by the second coil. Here, the second coil is operable to detect changes in the electromagnetic field produced by the first coil associated with a ferrous object in proximity to the seal pocket assembly. Further arrangements are also contemplated for the coils of the seal pocket assembly. For example, in some embodiments, both the first coil and second coil are actively energized. Similarly, both coils may be passive, or the coils may be selectively energized. For example, in some embodiments, a signal may be transmitted to switch one or more of the coils from a passive state to an active state to thereby conserve energy associated with constantly energizing the coils.

Additionally, or alternatively, embodiments are contemplated in which the seal pocket assembly 214 is movably installed in the tubing sections. For example, the seal pocket assembly 214 may be operable to move vertically through the bore 206 such that the seal pocket assembly 214 can be moved across different tubing sections. Accordingly, in some such embodiments, the seal pocket assembly 214 may be selectively moved to a particular tubing section to determine whether a ferrous object is present within said tubing section. For example, the seal pocket assembly 214 may be moved responsive to a received operator input.

Figure 3B:
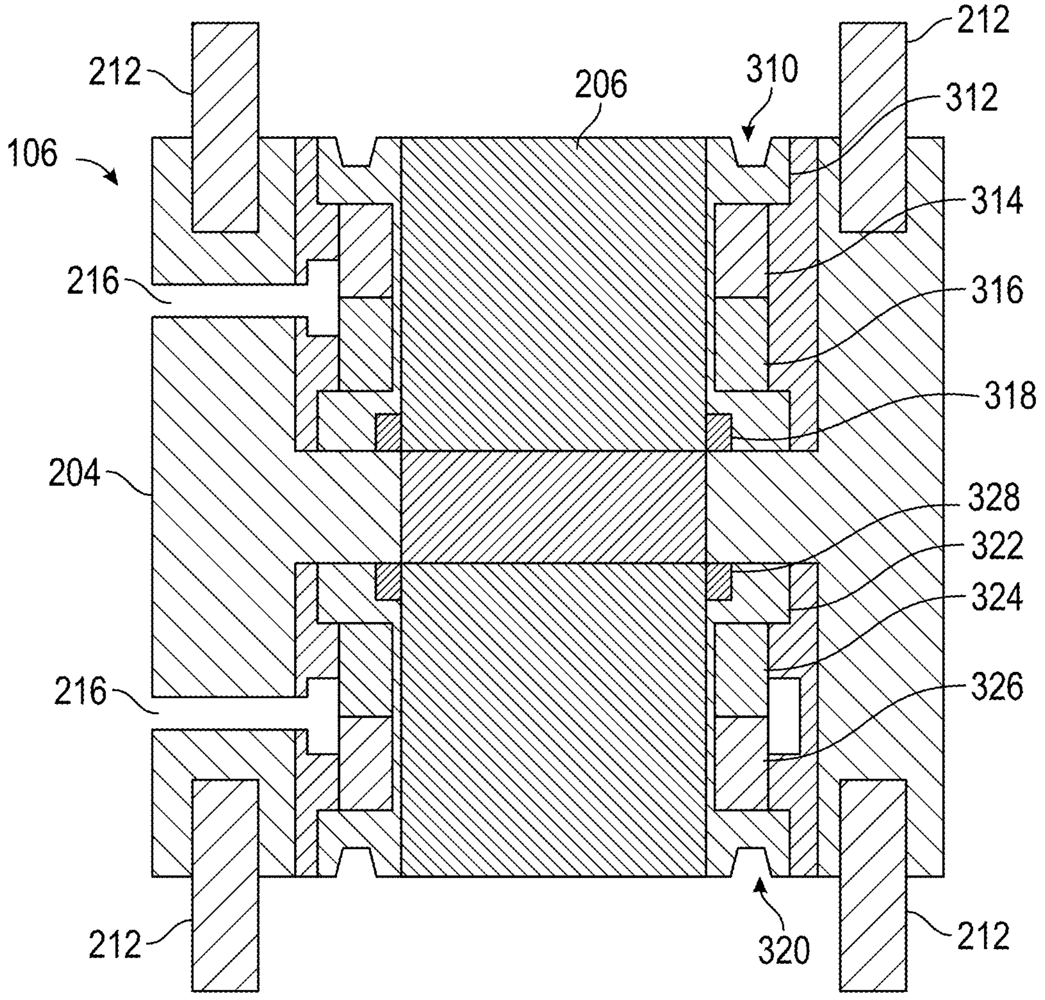
FIG. 3B illustrates a cross-sectional view of an exemplary tubing section joint with a pair of dual coil seal pocket assemblies relating to some embodiments.

FIG. 3B illustrates a cross-sectional view of an exemplary tubing section joint 106 with a pair of dual coil seal pocket assemblies relating to some embodiments. The pair of dual coil seal pocket assemblies comprises an upper seal pocket assembly 310 including an upper insert body 312, an upper primary coil 314, an upper secondary coil 316, and an upper seal ring 318. The pair of dual coil seal pocket assemblies further comprises a lower seal pocket assembly 320 including a lower insert body 322, a lower primary coil 324, a lower secondary coil 326, and a lower seal ring 328.

In some embodiments, the upper seal pocket assembly 310 and upper insert body 312 may be used in combination to determine a position of an object within the bore 206. For example, if the object has been observed passing downward through the upper seal pocket assembly 310 but has not yet been observed by the lower seal pocket assembly 320, it may be determined that the object is currently between the upper seal pocket assembly 310 and the lower seal pocket assembly 320. Further, in some embodiments, the pair of seal pocket assemblies may also monitor a direction of the object. For example, the upper seal pocket assembly 310 and the lower seal pocket assembly 320 may be disposed in a series along the bore 206 to thereby monitoring a direction of the object. Here, the direction may be determined, for example, by comparing interferences in the electromagnetic fields of the respective seal pocket detection assemblies.

In some embodiments, the upper seal pocket assembly 310 and the lower seal pocket assembly 320 may provide varying detection sensitivities. For example, the upper seal pocket assembly 310 may have a higher electromagnetic detection sensitivity than the lower seal pocket assembly 320. Alternatively, in some embodiments, the lower seal pocket assembly 320 may have a higher sensitivity, or the coils may have the same or a substantially similar sensitivity.

The seal pocket assemblies shown are disposed along vertical portions of the tubing sections. However, embodiments are contemplated in which a seal pocket assembly may be disposed elsewhere and in a modified orientation. For example, in some embodiments, a seal pocket assembly may be disposed at a horizontal portion of a tubing section, such as at a cross-flow section of the tubing system. Further, embodiments are contemplated in which the seal pocket assembly may be mounted within the well tree 102, at a spool piece, at a gate valve inlet or outlet, or at a wireline connector of the well tubing system. Further, the seal pocket assembly may be disposed at either of a surface portion or a sub-surface portion of the well system. Further still, in some embodiments, the well system may comprise a sub-sea well system such that the seal pocket assembly may be disposed underwater.

In some embodiments, the seal pocket assembly further comprises at least one spacer that contains a pressure within the joint. The spacer may comprise a non-ferrous material as to not interfere with the electromagnetic field. For example, the spacer may comprise a hard plastic, rubber, fiberglass, or other non-ferrous material that provides structural support and a pressure seal within the joint.

Figure 4A:
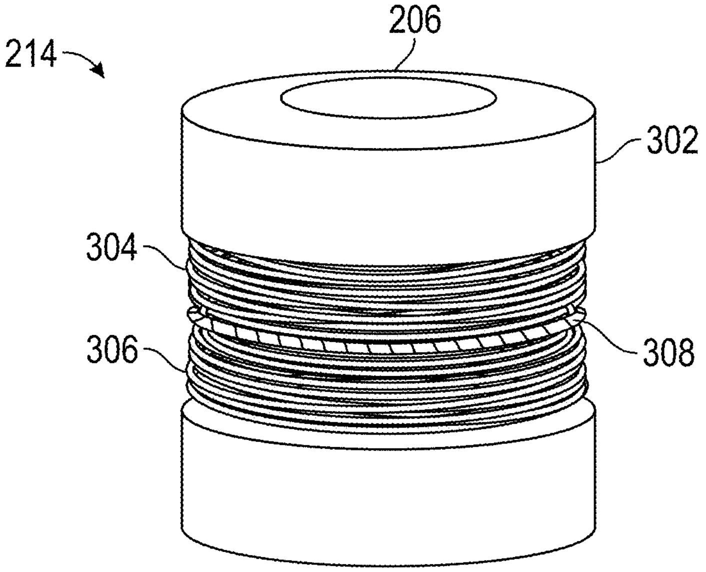
FIG. 4A illustrates an exemplary seal pocket assembly relating to some embodiments.

FIG. 4A illustrates an exemplary seal pocket assembly 214 relating to some embodiments. The seal pocket assembly 214 comprises the insert body 302, the primary coil 304, and the secondary coil 306 disposed circumferentially around the internal bore 206. In some embodiments, a coil assembly housing 402 is included for receiving the primary coil 304 and the secondary coil 306. In some embodiments, the coil assembly housing 402 comprises an enclosure that surrounds at least a portion of the coils. Alternatively, or additionally, in some embodiments, the coil assembly housing 402 comprises an internal structure that supports the coils 304 and 306. Further, in some embodiments, the coil assembly housing 402 is at least partially formed of a rigid plastic and/or other non-ferrous material, as to not interfere with the electromagnetic field of the seal pocket assembly 214. In some embodiments, the seal ring 308 may be included internally to the insert body 302, not visible in the particular view shown in FIG. 4A.

In some embodiments, the insert body 302 is selectively removable. Accordingly, embodiments are contemplated in which the seal pocket assembly 214 is removably installed within the tubing sections 104 at a respective joint 106, such that the insert body 302 and remainder of the seal pocket assembly 214 may be removed for replacing at least a portion of the seal pocket assembly 214. For example, in some embodiments, the insert body 302 may be removed to replace the coils after a useful lifetime of the coils has expired or after the coils have been deemed defective. Further still, the insert body 302 may be temporarily removed to repair one or more portions of the seal pocket assembly 214. Additionally, in some embodiments, the seal pocket assembly 214 is removably installed to replace or retrofit an existing seal pocket assembly, for example, to upgrade an existing seal pocket assembly without detection capabilities.

Figure 4B:
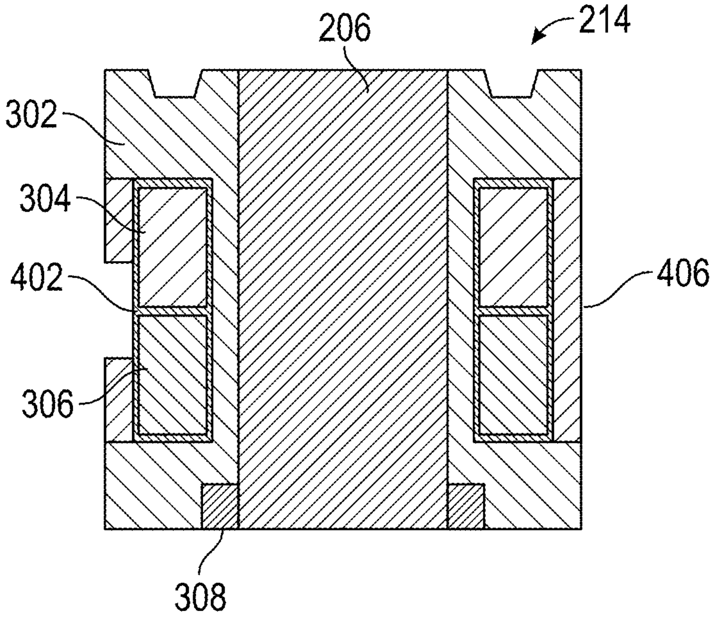
FIG. 4B illustrates a cross-sectional view of the exemplary seal pocket assembly relating to some embodiments.

FIG. 4B illustrates a cross-sectional view of the exemplary seal pocket assembly 214 relating to some embodiments. The cross-sectional view shows the cross-section taken at a center of the internal bore 206 such that respective cross-sections of the insert body 302, primary coil 304, secondary coil 306, and seal ring 308 are visible. The cross-sectional view also shows the coil assembly housing 402 including an enclosure encompassing the primary coil 304 and the secondary coil 306. In some embodiments, the coil assembly housing 402 includes a first cavity for receiving the primary coil 304 and a second cavity for receiving the secondary coil 306. The coil assembly housing 402 may provide a protective covering to prevent damage and wear to the primary coil 304 and the secondary coil 306 in addition to providing structural support and holding the coils in place.

The seal ring 308 is disposed around the bore 206 along an inner surface of the insert body 302. In some embodiments, the insert body 302 includes a cutaway portion or groove for receiving the seal ring 308 on the internal surface of the insert body 302. Similarly, the insert body 302 may include another cutaway portion on an outer surface of the insert body 302 for receiving the coil assembly housing 402, primary coil 304, and secondary coil 306. In some embodiments, an outer covering 406 is included on an outer surface of the insert body 302. In some such embodiments, the outer covering 406 is disposed around the coil assembly housing 402, as shown, thereby providing further protection and generating a flush outer surface with the insert body 302.

Figure 5:
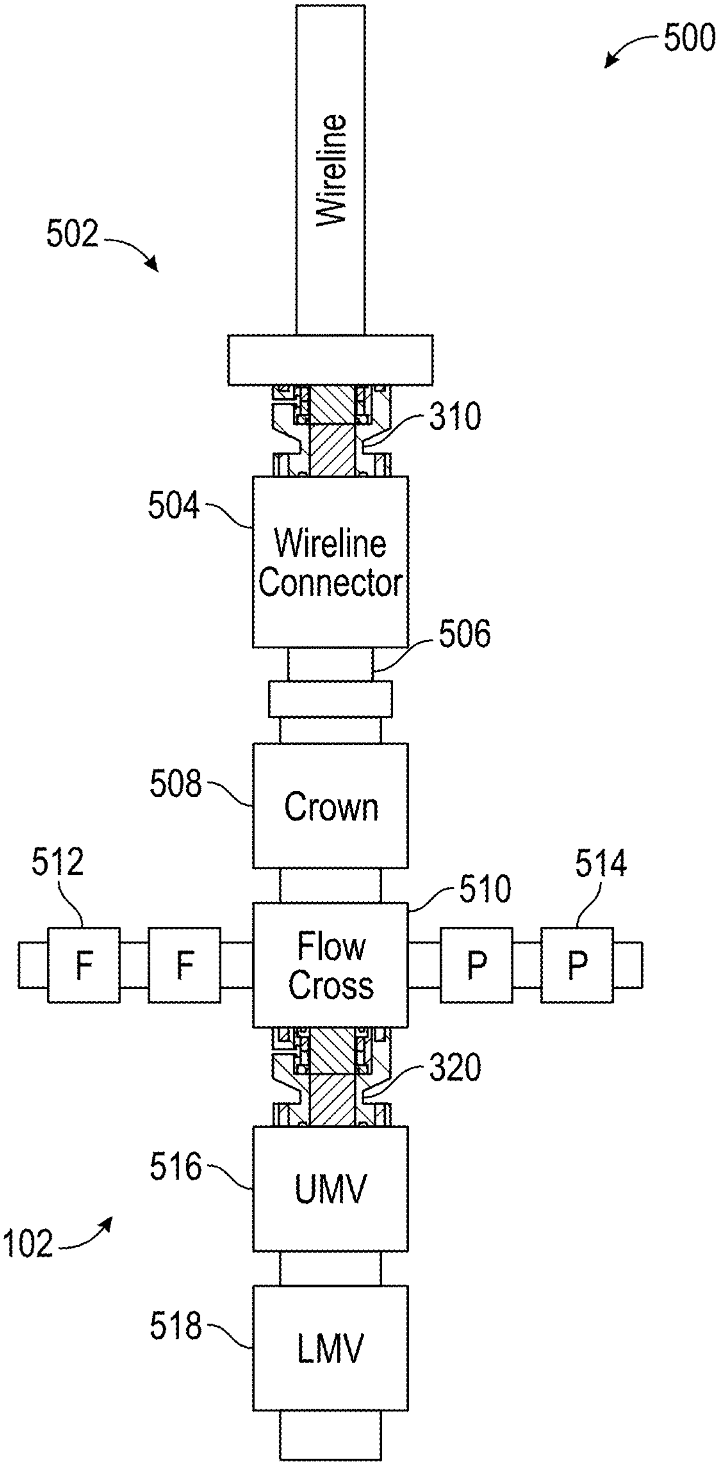
FIG. 5 illustrates an exemplary surface system relating to some embodiments.

FIG. 5 illustrates an exemplary surface system 500 relating to some embodiments. The surface system 500 includes the surface well tree 102 interfaced with a wireline system 502. The wireline system 502 includes a wireline section and a wireline connector 504 that interfaces with a portion of the surface well tree 102 such that a wireline can be lowered through the surface well tree 102. The surface well tree 102 includes a landing hub 506, a crown 508, a flow cross connection 510 with an inlet 512 and an outlet 514, an upper master valve 516, and a lower master valve 518.

In some embodiments, the upper seal pocket assembly 310 and the lower seal pocket assembly 320 are integrated into the surface system 500. For example, the upper seal pocket assembly 310 may be integrated into the wireline system 502 between a section of the wireline system 502 and the wireline connector 504, as shown. Similarly, the lower seal pocket assembly 320 may be integrated into the surface tree 102 between the flow cross connection 510 and the upper master valve 516, as shown. However, in some embodiments, other arrangements are contemplated for the seal pocket assemblies. For example, in some such embodiments, at least one of the seal pocket assemblies (or an additional seal pocket assembly) is disposed in a different location within the surface system 500 or underground at a sub-surface portion of the well. Further, embodiments are contemplated in which a single seal pocket assembly is included.

The wireline system 502 is configured to receive a wireline or wireline tool into the bore 206 for lowering through or moving up the plurality of tubing sections 104. In some embodiments, the wireline system 502 includes one or more valves such as a wireline valve configured to selectively seal off a portion of the tubing sections.

In some embodiments, one or more valves of the exemplary surface system 500 such as, the wireline valve of the wireline system 502, the upper master valve 516, and the lower master valve 518 may be operated based at least in part on a signal measured by the upper seal pocket assembly 310 and the lower seal pocket assembly 320. For example, the wireline valve may be prevented from closing based on information collected by the upper seal pocket assembly 310 indicating that an object is currently disposed in the bore of the tubing sections beneath the wireline system 502. Similarly, for example, the upper master valve 516 and the lower master valve 518 may be opened responsive to determining that an object is approaching or has passed through the lower seal pocket assembly 320.

Embodiments are contemplated in which either of the upper seal pocket assembly 310 or the lower seal pocket assembly 320 are disposed elsewhere within the exemplary surface system 500. For example, in some embodiments, the lower seal pocket assembly 320 may be disposed at the flow cross connection 510 at the joint between two vertical tubing sections and the inlet 512 and outlet 514 of the flow cross connection 510. Further still, in some embodiments, seal pocket assemblies are included in addition to the upper seal pocket assembly 310 and the lower seal pocket assembly 320.

Figure 6:
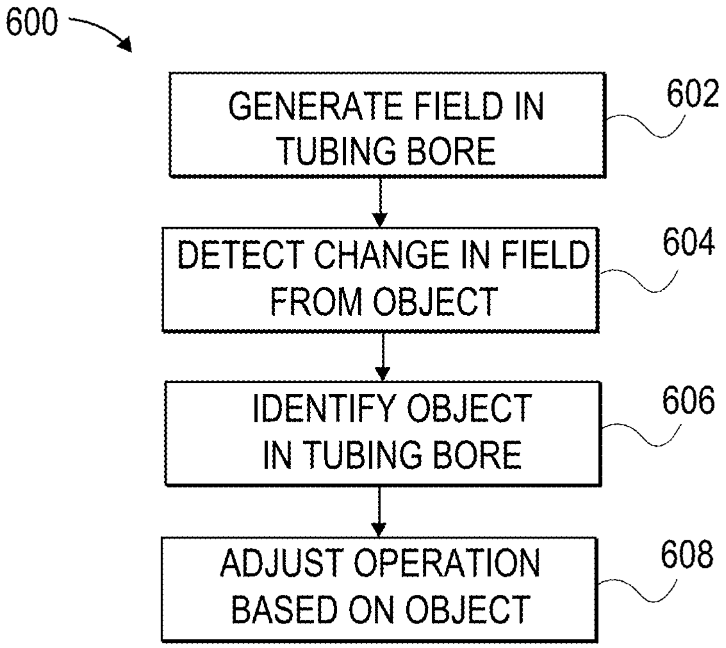
FIG. 6 illustrates an exemplary method for a well tree tubing system relating to some embodiments.

FIG. 6 illustrates an exemplary method 600 for a well tubing system relating to some embodiments. In some such embodiments, any portion of the steps described herein may be carried out on at least one processor, for example, by executing one or more non-transitory computer-readable media storing computer-executable instructions, such as a processor of a control system of the well tubing system.

At step 602, an electromagnetic field is generated within the bore 206 of the tubing sections 104. The electromagnetic field may be generated by any combination of coils disposed within the seal pocket assembly, as described above, for example, any combination of energized and passive electrical coils such as the primary coil 304, the secondary coil 306, the upper primary coil 314, the upper secondary coil 316, the lower primary coil 324, and the lower secondary coil 326.

At step 604, a change in the electromagnetic field is detected associated with one or more ferrous objects passing through or approaching the vicinity of the electromagnetic field. For example, in some embodiments, a sensor may be configured to measure a signal associated with the electromagnetic field over time. Accordingly, the sensor may receive a first signal associated with a resting state in which there is no object near the seal pocket assembly such that there is no interference present in the electromagnetic field. The sensor may receive a second signal associated with a subsequent state in which there is an object near the seal pocket assembly that interferes with the electromagnetic field. In some such embodiments, the change may be detected by comparing the second signal to the first signal.

At step 606, the ferrous object is identified within the bore 206 based on the detected change in the electromagnetic field due to the presence of the ferrous object within the electromagnetic field. In some embodiments, the object may be identified by comparing the first signal to the second signal, as described above. In some embodiments, parameters such as any of a size, direction, and speed of the object may be deduced based at least in part on the detected signals or comparison thereof. For example, if there is a large change in the electromagnetic field it may be determined that a relatively large object has passed through the seal pocket assembly or that the object is traveling at a high speed. In one example, where the object 112 comprises a wire or cable, a gauge of the wire may be estimated based at least in part on the interference detected within the electromagnetic field. Accordingly, a plurality of wires having different gauges may be distinguished between such that a particular type of wire may be identified by its effect on the electromagnetic field.

At step 608, at least one operation of the well tubing system is adjusted based at least in part on the detection and/or identification of the object. For example, embodiments are contemplated in which one or more valves are adjusted based on detecting an object within the bore (or determining that no object is currently present in the bore). Here, a valve may be opened based on a determination that an object is traveling through the bore or a valve may be closed based on a determination that an object has exited the bore or is otherwise not currently present or in proximity to the respective valve. Further, embodiments are contemplated in which valves may be opened and/or closed based on a proximity of an object traveling through the bore as determined by the seal pocket assembly. Further still, in some embodiments, one or more valves may be prevented from closing responsive to detection of an object in the bore. For example, if a wire is detected within the bore, one or more valves may be locked and prevented from closing as to prevent closing of the valves around the wire from cutting or damaging the wire or any other objects attached thereto.

Alternatively, or additionally, in some embodiments, adjusting operation based on the identified object includes transmitting a notification to an operator and/or to a control system of the hydraulic fracturing system 100. For example, a signal comprising information indicative of the detected object may be transmitted through a cable, such as the cable disposed in the cable routing port 216. The signal may be transmitted to a control system at the surface portion, which may notify an operator or automatically adjust operation of the hydraulic fracturing system 100 based on the signal. In some such embodiments, a notification signal may be transmitted via either of a wired or wireless communication connection, such as over a wireless network to notify an operator or another remote control system of the object. For example, an embodiment is contemplated in which a light is switched on responsive to determining that an object is present within the bore 206 at a particular seal pocket assembly and the light is switched off responsive to detecting the absence of the object. However, it should be understood that a variety of different suitable notification techniques are also contemplated.

In some embodiments, the seal pocket detection assembly 214 is disposed around a main bore of the tubing, as described above. However, further embodiments are contemplated in which a seal pocket detection assembly may be disposed around another bore or around one or more ancillary lines that feed into the main bore (or are otherwise connected to the main bore). Accordingly, in certain isolation ball operations where the isolation ball is inserted through one of the ancillary lines, for example, the isolation ball may be detected by the seal pocket detection assembly as it passes through the ancillary line to confirm that the isolation ball was injected correctly and successfully cleared at least a portion of a stack of tubing sections.

Clause 1. A seal pocket detection assembly disposed at a joint of one or more well tree tubing sections, the seal pocket detection assembly comprising: a removable insert body; one or more seals disposed at an inner surface of the removable insert body, the one or more seals providing a pressure seal to the joint; and a coil assembly disposed at least partially within the pressure seal of the joint, the coil assembly comprising: a coil assembly housing disposed at an outer surface of the removable insert body; and at least one coil disposed around a bore of the one or more well tree tubing sections in a cavity of the coil assembly housing, wherein the at least one coil produces an electromagnetic field within the bore, wherein the coil assembly detects a ferrous object disposed within the bore of the one or more well tree tubing sections based on a change to the electromagnetic field associated with the ferrous object passing through the electromagnetic field.

Clause 2. The seal pocket detection assembly of clause 1, wherein the coil assembly further comprises: a coil assembly cover disposed over the outer surface of the removable insert body.

Clause 3. The seal pocket detection assembly of any of clause 1 or clause 2, wherein the coil assembly further comprises: a primary coil disposed in a first cavity of the coil assembly housing; and a secondary coil disposed in a second cavity of the coil assembly housing.

Clause 4. The seal pocket detection assembly of any of clause 1 through clause 3, wherein the coil assembly housing comprises a plastic enclosure defining the first cavity and the second cavity.

Clause 5. The seal pocket detection assembly of any of clause 1 through clause 4, wherein the ferrous object detected by the coil assembly includes a perforating gun.

Clause 6. The seal pocket detection assembly of any of clause 1 through clause 5, further comprising: a spacer that contains a pressure within the joint of the one or more well tree tubing sections, the spacer comprising a non-ferrous material such that the spacer does not interfere with the electromagnetic field.

Clause 7. The seal pocket detection assembly of any of clause 1 through clause 6, wherein the ferrous object is attached to a non-ferrous component for detection of the non-ferrous component.

Clause 8. A seal pocket detection system disposed at a joint of one or more well tree tubing sections, the seal pocket detection system comprising: an upper seal pocket detection assembly comprising: an upper removable insert body disposed at an upper portion of the joint; an upper coil assembly comprising: an upper coil assembly housing disposed at an outer surface of the upper removable insert body; a primary upper coil disposed around a bore of the one or more well tree tubing sections in a first cavity of the upper coil assembly housing; and a secondary upper coil disposed around the bore of the one or more well tree tubing sections in a second cavity of the upper coil assembly housing; and a lower seal pocket detection assembly comprising: a lower removable insert body disposed at a lower portion of the joint; a lower coil assembly comprising: a lower coil assembly housing disposed at an outer surface of the lower removable insert body; a primary lower coil disposed around the bore of the one or more well tree tubing sections in a first cavity of the lower coil assembly housing; and a secondary lower coil disposed around the bore of the one or more well tree tubing sections in a second cavity of the lower coil assembly housing; one or more seals disposed at an inner surface of the upper removable insert body and the lower removable insert body, the one or more seals providing a pressure seal to the joint; and wherein one of the upper coil assembly or the lower coil assembly detects at least one ferrous object disposed within the bore of the one or more well tree tubing sections.

Clause 9. The seal pocket detection system of clause 8, wherein the upper seal pocket detection assembly has a higher electromagnetic detection sensitivity than the lower seal pocket detection assembly.

Clause 10. The seal pocket detection system of any of clause 8 or clause 9, wherein the upper coil assembly and the lower coil assembly are disposed in a series along the bore of the one or more well tree tubing sections to thereby monitor a direction of the at least one ferrous object.

Clause 11. The seal pocket detection system of any of clause 8 through clause 10, wherein the upper seal pocket detection assembly is configured to operate actively by applying electrical power to the primary upper coil and measuring an electromagnetic field using the secondary upper coil.

Clause 12. The seal pocket detection system of any of clause 8 through clause 11, wherein the upper seal pocket detection assembly is configured to operate passively to detect a magnetic field associated with the at least one ferrous object.

Clause 13. The seal pocket detection system of any of clause 8 through clause 12, wherein the upper seal pocket detection assembly and the lower seal pocket detection assembly are disposed within a single pressure containing body of the joint.

Clause 14. The seal pocket detection system of any of clause 8 through clause 13, wherein the joint comprises a cross-flow connection of the one or more well tree tubing sections and the upper removable insert body and the lower removable insert body are disposed adjacent to the cross-flow connection.

Clause 15. A well tubing system comprising: a plurality of well tubing sections; a plurality of joints, each joint of the plurality of joints connecting a respective pair of tubing sections of the plurality of tubing sections; and a plurality of seal pocket detection assemblies, each seal pocket detection assembly of the plurality of seal pocket detection assemblies disposed at a respective joint of the plurality of joints and comprising: a removable insert body; one or more seals disposed at an inner surface of the removable insert body, the one or more seals providing a pressure seal to the respective joint; and a coil assembly comprising: a coil assembly housing disposed at an outer surface of the removable insert body; and at least one coil disposed around a bore of the respective pair of tubing sections in a cavity of the coil assembly housing, wherein the at least one coil produces an electromagnetic field within the bore of the respective pair of tubing sections, wherein the coil assembly detects a ferrous object disposed within the bore of the respective pair of tubing sections based on a change to the electromagnetic field associated with the ferrous object passing through the electromagnetic field.

Clause 16. The well tubing system of clause 15, further comprising: a plurality of clamps, each clamp of the plurality of clamps disposed around a respective joint to secure the respective pair of tubing sections together.

Clause 17. The well tubing system of any of clause 15 or clause 16, wherein the well tubing system is a hydraulic fracturing system.

Clause 18. The well tubing system of any of clause 15 through clause 17, further comprising: one or more valves associated with the plurality of tubing sections, wherein the one or more valves are adjusted in response to the coil assembly detecting the ferrous object.

Clause 19. The well tubing system of any of clause 15 through clause 18, further comprising: a cable routing port comprising a cable routing opening for receiving one or more cables within a hub of at least one of the plurality of tubing sections.

Clause 20. The well tubing system of any of clause 15 through clause 19, further comprising: a test port comprising a test opening within the hub of at least one of the plurality of tubing sections.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of detecting an object within a tubing bore of a well system using a seal pocket detection assembly, the method comprising:

providing the seal pocket detection assembly including:

a pair of electrical coils including a first electrical coil and a second electrical coil positioned in a series along the tubing bore;

generating a first electromagnetic field that extends at least partially into the tubing bore of the well system using the first electrical coil of the pair of electrical coils;

generating a second electromagnetic field that extends at least partially into the tubing bore using the second electrical coil of the pair of electrical coils;

detecting at least one change in the first electromagnetic field associated with the object passing through the first electromagnetic field;

detecting at least one change in the second electromagnetic field associated with the object passing through the second electromagnetic field;

identifying a position and direction of the object within the tubing bore based on the at least one change in the first electromagnetic field and the at least one change in the second electromagnetic field, wherein the direction is identified by comparing the at least one change in the first electromagnetic field and the at least one change in the second electromagnetic field.

2. The method of claim 1, wherein the seal pocket detection assembly is disposed at a tubing joint of the well system.

3. The method of claim 2, further comprising:

maintaining a pressure at the tubing joint of the well system using at least one pressure seal of the seal pocket detection assembly.

4. The method of claim 1, further comprising:

transmitting at least one signal including information indicative of the position of the object from the seal pocket detection assembly.

5. The method of claim 4, further comprising:

adjusting at least one operation of the well system based on identification of the object within the tubing bore.

6. The method of claim 1, wherein the seal pocket detection assembly further includes a removable insert body and the first electrical coil and the second electrical coil are disposed on an outer surface of the removable insert body, the method further comprising:

removing the seal pocket detection assembly from the well system.

7. The method of claim 6, further comprising:

after removing the seal pocket detection assembly, replacing at least a portion of the seal pocket detection assembly.

8. One or more non-transitory computer-readable media that store computer-executable instructions that, when executed by at least one processor perform a method of operation for a seal pocket detection assembly of a well system, the seal pocket detection assembly comprising at least an insert body, a sealing portion, and a detection portion, the method comprising:

generating a first electromagnetic field that extends at least partially into a tubing bore of the well system using a first electrical coil of the detection portion, wherein a pressure is maintained at a tubing joint of the well system using one or more sealing elements of the sealing portion disposed on an inner surface of the insert body;

generating a second electromagnetic field that extends at least partially into the tubing bore of the well system using a second electrical coil of the detection portion, the second electrical coil positioned in a series with the first electrical coil along the tubing bore;

detecting at least one change in the first electromagnetic field associated with an object passing through the first electromagnetic field using the first electrical coil of the detection portion;

detecting at least one change in the second electromagnetic field associated with the object passing through the second electromagnetic field using the second electrical coil of the detection portion;

identifying a position of the object within the tubing bore based on the at least one change in the first electromagnetic field or the second electromagnetic field;

determining a direction of the object within the tubing bore based at least in part on a comparison of the at least one change in the first electromagnetic field and the at least one change in the second electromagnetic field; and adjusting at least one operation of the well system based on identification of the object within the tubing bore.

9. The one or more non-transitory computer-readable media of claim 8, wherein the method further comprises:

wirelessly transmitting at least one signal including information indicative of the position of the object using a wireless communication connection of the seal pocket detection assembly.

10. The one or more non-transitory computer-readable media of claim 9, wherein the at least one signal includes an operator notification notifying an operator of the well system of the object.

11. The one or more non-transitory computer-readable media of claim 9, wherein the at least one signal includes a control notification notifying a control system of the well system of the position of the object.

12. The one or more non-transitory computer-readable media of claim 8, wherein adjusting the at least one operation includes opening one or more valves of the well system.

13. The one or more non-transitory computer-readable media of claim 8, wherein adjusting the at least one operation includes closing one or more valves of the well system.

14. The one or more non-transitory computer-readable media of claim 8, further comprising:

monitoring the first electromagnetic field and the second electromagnetic field over time using the detection portion.

15. A method for sensing one or more objects within a tubing bore of a well system, the method comprising:

providing a seal pocket detection assembly comprising:

at least one insert body comprising a groove on an inner surface thereof and a cutaway portion on an outer surface thereof;

a sealing portion including one or more sealing elements disposed proximate to a tubing joint of the well system within the groove on the inner surface of the at least one insert body; and a detection portion including at least one coil disposed within the cutaway portion on the outer surface of the at least one insert body;

maintaining a pressure at the tubing joint of the well system using the one or more sealing elements of the sealing portion;

generating an electromagnetic field that extends at least partially into the tubing bore of the well system using the at least one coil of the detection portion;

detecting at least one change in the electromagnetic field associated with the one or more objects passing through the electromagnetic field using the detection portion; and identifying a position of the one or more objects within the tubing bore based on the at least one change in the electromagnetic field.

16. The method of claim 15, further comprising:

adjusting at least one operation of the well system based on the position of the one or more objects within the tubing bore.

17. The method of claim 15, further comprising:

electrically coupling one or more cables to the at least one coil through an opening in a cable routing portion of the seal pocket detection assembly.

18. The method of claim 17, further comprising:

responsive to detecting the at least one change in the electromagnetic field, transmitting a signal indicative of the position of the one or more objects through the one or more cables.

19. The method of claim 15, further comprising:

measuring one or more internal parameters of tubing sections of the well system using at least one testing cable disposed through a testing port routed around the seal pocket detection assembly.

20. The method of claim 15, further comprising:

applying an electrical power from a power source to the at least one coil to actively energize the at least one coil.

* * * * *